(12) United States Patent
Kim et al.

(10) Patent No.: US 8,224,617 B2
(45) Date of Patent: Jul. 17, 2012

(54) APPARATUS AND METHOD FOR CALCULATING TEMPERATURE DEPENDENT GREEN'S FUNCTION USING WEIGHT FUNCTION

(75) Inventors: Wan Jae Kim, Daejeon (KR); Jong Jooh Kwon, Daejeon (KR); Gyeong Hoi Koo, Daejeon (KR); Tae Ryong Kim, Daejeon (KR)

(73) Assignee: Korea Hydro & Nuclear Power Co., Ltd., Seoul (KR)

( * ) Notice: Subject to any disclaimer, the term of this patent is extended or adjusted under 35 U.S.C. 154(b) by 424 days.

(21) Appl. No.: 12/507,729

(22) Filed: Jul. 22, 2009

(65) Prior Publication Data

US 2011/0022347 A1 Jan. 27, 2011

(51) Int. Cl.
*G01K 17/00* (2006.01)
(52) U.S. Cl. .................................................. 702/136
(58) Field of Classification Search .............. 702/136
See application file for complete search history.

(56) References Cited

U.S. PATENT DOCUMENTS

| 4,228,359 | A | * | 10/1980 | Matsumoto et al. | ........ 290/40 R |
| 4,908,775 | A | * | 3/1990 | Palusamy et al. | ............... 702/34 |
| 2005/0085949 | A1 | | 4/2005 | Kirchhof | |
| 2009/0028697 | A1 | | 1/2009 | Shi et al. | |

FOREIGN PATENT DOCUMENTS

KR 2002-0041965 6/2002

* cited by examiner

*Primary Examiner* — Cindy H Khuu
(74) *Attorney, Agent, or Firm* — Edwards Wildman Palmer LLP

(57) ABSTRACT

Disclosed are an apparatus and a method for calculating a temperature dependent Green's function using an appropriate weight function. The apparatus includes a material temperature change information input unit inputting change information of a material temperature; and a temperature dependent Green's function calculation unit receiving the change information of the material temperature through the material temperature change information input unit, calculating a temperature dependent Green's function using a weight function, and outputting the calculated result. According to aspects of embodiments, accuracy in the calculation of a thermal stress value can be improved by designing the weight function such that changes in physical properties of a material that change according to temperature changes are considered.

18 Claims, 3 Drawing Sheets

APPARATUS AND METHOD FOR CALCULATING TEMPERATURE DEPENDENT GREEN'S FUNCTION USING WEIGHT FUNCTION

BACKGROUND OF THE INVENTION

1. Field of the Invention

The present invention relates generally to calculating thermal stress values of materials generated under certain temperature conditions, and more particularly, to an apparatus and a method for calculating a temperature dependent Green's function using a weight function adapted to improve accuracy in the calculation of a thermal stress value by designing the weight function such that changes in physical properties of a material that change according to temperature changes are considered.

2. Description of the Related Art

In general, a Green's function is a special type of function used to solve a boundary value problem for an ordinary differential equation or an oval or parabolic partial differential equation. Green's function is named after the British mathematician George Green, who first developed the concept in the 1830s.

A technology applied using a Green's function is disclosed in Korean Patent Publication No. 2002-0041965, entitled "APPARATUS AND METHOD OF MONITORING POWER PLANT'S THERMAL STRESS".

The following <Equation 1> represents a calculation of a thermal stress value using a Green's function.

$$\sigma_T(p,t) = \int_{t-t_d}^{t} G(p, t-\tau)\frac{\partial}{\partial \tau}\phi(\tau)d\tau \qquad <\text{Equation 1}>$$

$$= G_s(p)\phi(t) + \sum_{t-t_d}^{t} G(p, t-\tau)\Delta\phi(\tau)$$

where $G_s(p)$ represents a Green's function at a predetermined point after an attenuation period elapses, and $\phi(\tau)$ represents an actual temperature measurement value at a monitoring position that is changed over time. $G(p, t-\tau)$ is a Green's function during an attenuation period, and $\Delta\phi(\tau)$ represents a temperature change value during an attenuation period at a predetermined interval.

Accordingly, since $G_s(p)$ and $G(p, t-\tau)$ are predetermined values, thermal stress a $\sigma_T(p,t)$ is determined by $\phi(t)$ and $\Delta\phi(\tau)$, which are actual temperature measurement values at a monitoring position that is changed over time.

Additionally, a thermal stress value at an arbitrary time and position is obtained by multiplying a differential value of a boundary temperature to a Green's function and then integrating its result for a given time.

Meanwhile, since changes in thermal, mechanical and physical properties (for example, thermal conductivity coefficient, thermal expansion coefficient, specific heat coefficient, and elastic coefficient) of materials changed depending on temperature change ultimately change thermal stress values of materials, changes in physical properties of materials depending on temperature change must be considered. However, an existing Green's function does not reflect such changes and thus cannot obtain accurate thermal stress values.

SUMMARY OF THE INVENTION

In accordance with embodiments of the present invention, an apparatus and a method for calculating a temperature dependent Green's function using a weight function, which substantially overcome one or more of the problems due to the limitations and disadvantages of the related art.

It is therefore a feature of an embodiment to provide an apparatus and a method for calculating a temperature dependent Green's function using a weight function to improve accuracy in the calculation of a thermal stress value by designing the weight function such that changes in physical properties of a material that change according to temperature changes are considered.

At least one of the above and other features and advantages may be realized by providing a temperature dependent Green's function calculation device using a weight function includes a material temperature change information input unit inputting change information of a material temperature, and a temperature dependent Green's function calculation unit receiving the change information of the material temperature through the material temperature change information input unit, calculating a temperature dependent Green's function using a weight function, and outputting the calculated result.

At least one of the above and other features and advantages may be realized by providing a temperature dependent Green's function calculation device using a weight function includes a steady state thermal stress calculation unit receiving change information of a material temperature and calculating a steady state thermal stress with respect to a temperature dependent Green's function using a steady state thermal stress weight function, a transient state thermal stress calculation unit receiving change information of a material temperature and calculating a transient state thermal stress with respect to a temperature dependent Green's function using a transient state thermal stress weight function, and a temperature dependent thermal stress calculation unit receiving the steady state thermal stress calculated by the steady state thermal stress calculation unit and the transient state thermal stress calculated by the transient state thermal stress calculation unit, and calculating and outputting a temperature dependent thermal stress.

The steady state thermal stress calculation unit may calculate the steady state thermal stress weight function as a ratio of a temperature dependent thermal stress value to a temperature independent thermal stress value in a steady state.

The steady state thermal stress calculation unit may set and calculate the steady state thermal stress weight function as a polynomial function depending on temperature.

The transient state thermal stress calculation unit may calculate the transient state thermal stress weight function as a ratio of a temperature dependent thermal stress value to a temperature independent thermal stress value in a transient state.

The transient state thermal stress calculation unit may set and calculate the transient state thermal stress weight function as a weight function value with respect to an hourly rate of temperature change.

The temperature dependent thermal stress calculation unit may output a temperature dependent thermal stress using the following equation.

$$\sigma_T(p,t) = G_s(p)W_{Ts}(\phi)[\phi(t) - T_{ref}] + \sum_{t-t_d}^{t} \overline{G}(p, t-\tau)W_T(\phi)\Delta\phi(\tau)$$

where $\sigma_T(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau)W_T(\phi)\Delta\phi(\tau)$$

is a transient state thermal stress.

At least one of the above and other features and advantages may be realized by providing a method for calculating a temperature dependent Green's function using a weight function, the method includes receiving change information of a material temperature, and after the receiving of the change information, calculating a temperature dependent Green's function using a weight function and outputting the calculated result.

At least one of the above and other features and advantages may be realized by providing a method for calculating a temperature dependent Green's function using a weight function, the method includes calculating a steady state thermal stress with respect to a temperature dependent Green's function using a steady state thermal stress weight function after receiving change information of a material temperature, calculating a transient state thermal stress with respect to a temperature dependent Green's function using a transient state thermal stress weight function after receiving change information of a material temperature, and calculating and outputting a temperature dependent thermal stress after receiving the steady state thermal stress and the transient state thermal stress.

The calculating of the steady state thermal stress may include calculating the steady state thermal stress weight function as a ratio of a temperature dependent thermal stress value to a temperature independent thermal stress value in a steady state.

The calculating of the steady state thermal stress may include setting and calculating the steady state thermal stress weight function as a polynomial function dependent on temperature.

The calculating of the transient state thermal stress may include calculating the transient state thermal stress weight function as a ratio of a temperature dependent thermal stress value to a temperature independent thermal stress value in a transient state.

The calculating of the transient state thermal stress may include setting and calculating the transient state thermal stress weight function as a weight function value with respect to an hourly rate of temperature change.

The calculating and outputting of the temperature dependent thermal stress may include outputting a temperature dependent thermal stress using the following equation.

$$\sigma_T(p,t) = G_s(p)W_{Ts}(\phi)[\phi(t)-T_{ref}] + \sum_{t-t_d}^{t} \overline{G}(p, t-\tau)W_T(\phi)\Delta\phi(\tau)$$

where $\sigma_T(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau)W_T(\phi)\Delta\phi(\tau)$$

is a transient state thermal stress.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments related to an apparatus and a method for calculating a temperature dependent Green's function using a weight function will be described in more detail with reference to the accompanying drawings. Hereinafter, detailed descriptions related to well-known functions or configurations will be ruled out so as not to unnecessarily obscure subject matters of the present invention. Additionally, the following terms are defined by considering functions according to embodiments of the present invention, and this may vary based on an intention of a user or an operator, or precedents. Accordingly, meaning of each term needs to be interpreted based on contents of overall specification.

Embodiments of the present invention improve accuracy in the calculation of a thermal stress value by designing a weight function such that changes in physical properties of a material depending on temperature changes are considered.

Figure 1:
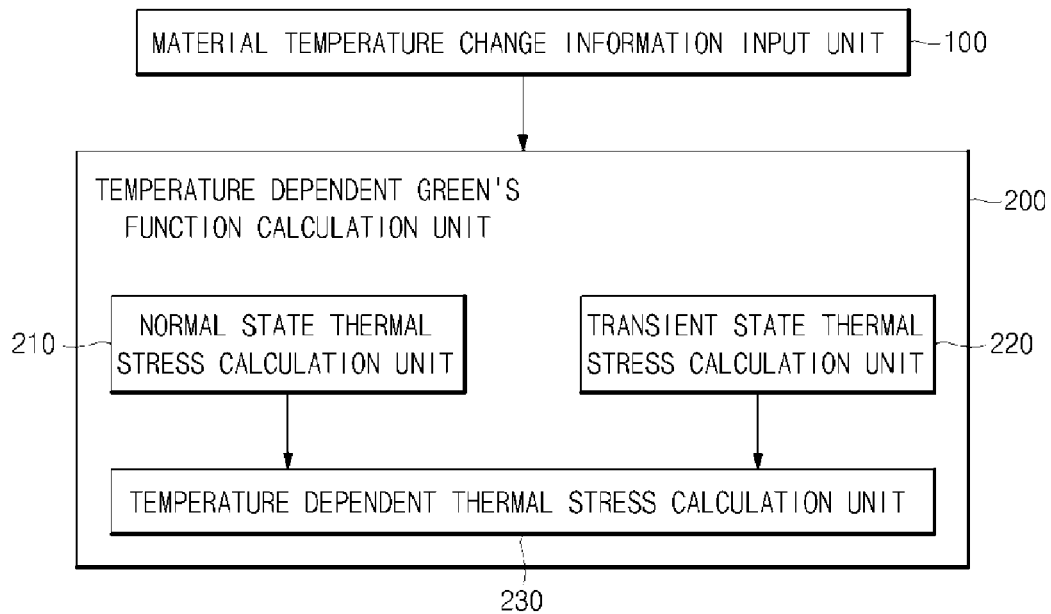
FIG. 1 illustrates a block diagram of an apparatus for calculating a temperature dependent Green's function using an appropriate weight function in accordance with an embodiment of the present invention.
Figure 2:
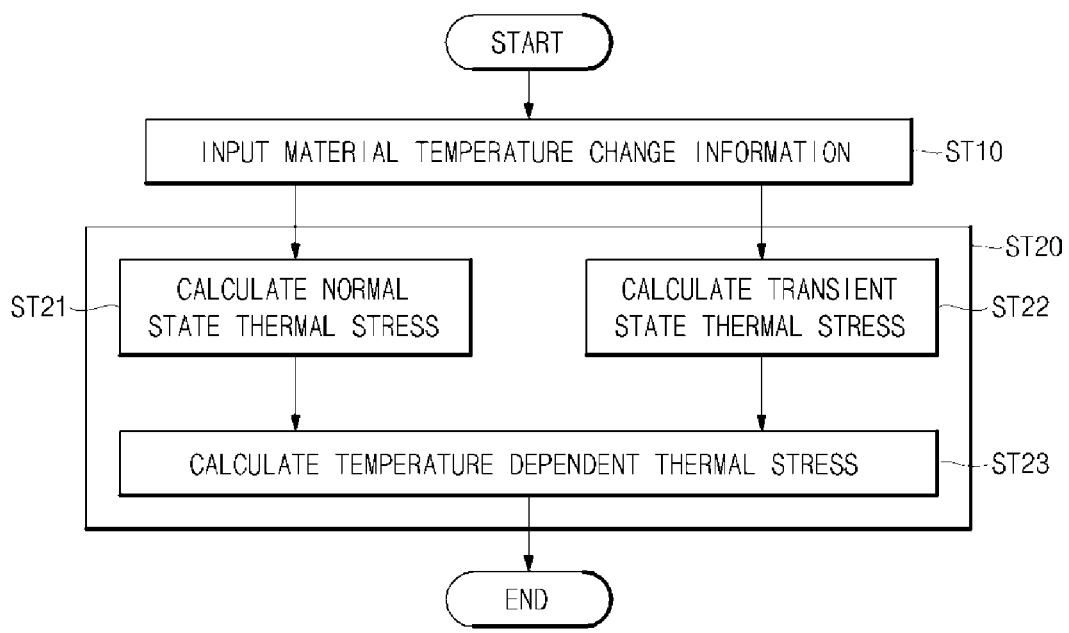
FIG. 2 illustrates a flowchart for calculating a temperature dependent Green's function using an appropriate weight function in accordance with an embodiment of the present invention.

FIG. 1 illustrates a block diagram of an apparatus for calculating a temperature dependent Green's function using an appropriate weight function according to an embodiment of the present invention. FIG. 2 illustrates a flowchart for calculating a temperature dependent Green's function using an appropriate weight function according to an embodiment of the present invention.

In accordance with an embodiment, referring to FIGS. 1 and 2 together, a material temperature change information input unit 100 inputs change information of a material temperature into a temperature dependent Green's function calculation unit 200 in operation ST10.

Then, the temperature dependent Green's function calculation unit 200 receives the change information of the material temperature from the material temperature change information input unit 100, and calculates a temperature dependent Green's function using a weight function and outputs its result in operation ST20.

Next, a steady state thermal stress calculation unit 210 in the temperature dependent Green's function calculation unit 200 receives the change information of the material temperature and calculates a steady state thermal stress with respect to a Green's function using a steady state thermal stress weight function 312 (shown in FIG. 3), and then delivers the calculated steady state thermal stress to a temperature dependent thermal stress calculation unit 230. At this point, the steady state thermal stress calculation unit 210 calculates the steady state thermal stress weight function 212 as a ratio of a temperature dependent thermal stress value and a temperature independent thermal stress value in a steady state. Additionally, the steady state thermal stress calculation unit 210 sets the steady state thermal stress weight function 212 as a polynomial function depending on temperature and performs a calculation in operation ST21.

A transient state thermal stress calculation unit 220 receives change information of a material temperature and calculates a transient state thermal stress with respect to a temperature dependent Green's function 321 (shown in FIG. 3) using a transient state thermal stress weight function 322 (shown in FIG. 3), and delivers the transient state thermal stress to the temperature dependent thermal stress calculation unit 230. At this point, the transient state thermal stress calculation unit 220 calculates the transient state thermal stress weight function 322 as a ratio of a temperature dependent thermal stress value and a temperature independent thermal stress value in a transient state. Furthermore, the transient state thermal stress calculation unit 220 may set the transient state thermal stress weight function 322 as a weight function value with respect to a temperature rate (Fahrenheit/second) and perform a calculation in operation ST22.

The temperature dependent thermal stress calculation unit 230 receives the steady state thermal stress calculated by the steady state thermal stress calculation unit 210 and the transient state thermal stress calculated by the transient state thermal stress calculation unit 220, and calculates a temperature dependent thermal stress and then outputs its result in operation ST23.

Figure 3:
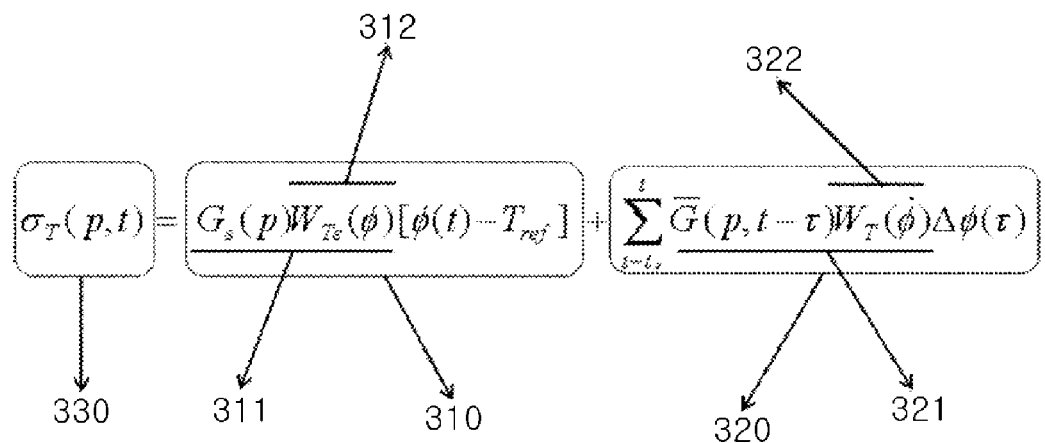
FIG. 3 illustrates a conceptual diagram of a temperature dependent Green's function using a weight function in accordance with an embodiment of the present invention.

FIG. 3 illustrates a conceptual diagram of a temperature dependent Green's function using a weight function according to an embodiment of the present invention.

Therefore, a temperature dependent Green's function using a weight function outputted from the temperature dependent thermal stress calculation unit 230 is the following <Equation 2> that outputs a temperature dependent thermal stress.

$$\sigma_T(p, t) = G_s(p)W_{Ts}(\phi)[\phi(t) - T_{ref}] + \sum_{t-t_d}^{t} \overline{G}(p, t-\tau)W_T(\phi)\Delta\phi(\tau) \quad <\text{Equation 2}>$$

where $\sigma_{64}$ (p,t) is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau)W_T(\phi)\Delta\phi(\tau)$$

is a transient state thermal stress.

Referring to FIG. 3, the reference numeral 310 represents a steady state thermal stress. The reference numerals 311 and 312 represent a temperature dependent Green's function and a steady state thermal stress weight function, respectively. The reference numeral 320 represents a transient state thermal stress. The reference numerals 321 and 322 represent a temperature dependent Green's function and a transient state thermal stress weight function, respectively. The reference numeral 330 represents a temperature dependent thermal stress.

Additionally, the steady state thermal stress 310 and the transient state thermal stress 320 are expressed with a product of a temperature and a Green's function with consideration of a temperature dependent physical property value of a material.

Moreover, the temperature dependent Green's functions 311 and 321 are expressed with a product of an existing Green's function and a weight function with consideration of a change in thermal stress value dependent on physical property change of a material.

Furthermore, the steady state thermal stress weight function 312 represents a ratio of a temperature dependent thermal stress value to a temperature independent thermal stress value under normal conditions as a temperature function. Therefore, when a steady state thermal stress weight function is multiplied by an existing Green's function, a temperature dependent Green's function is obtained. The steady state thermal stress weight function is changed according to the form, material, boundary temperature, and confined conditions of the object for which a thermal stress value is calculated, and is represented as an optimal curve of a polynomial function with temperature as a parameter.

Figure 4:
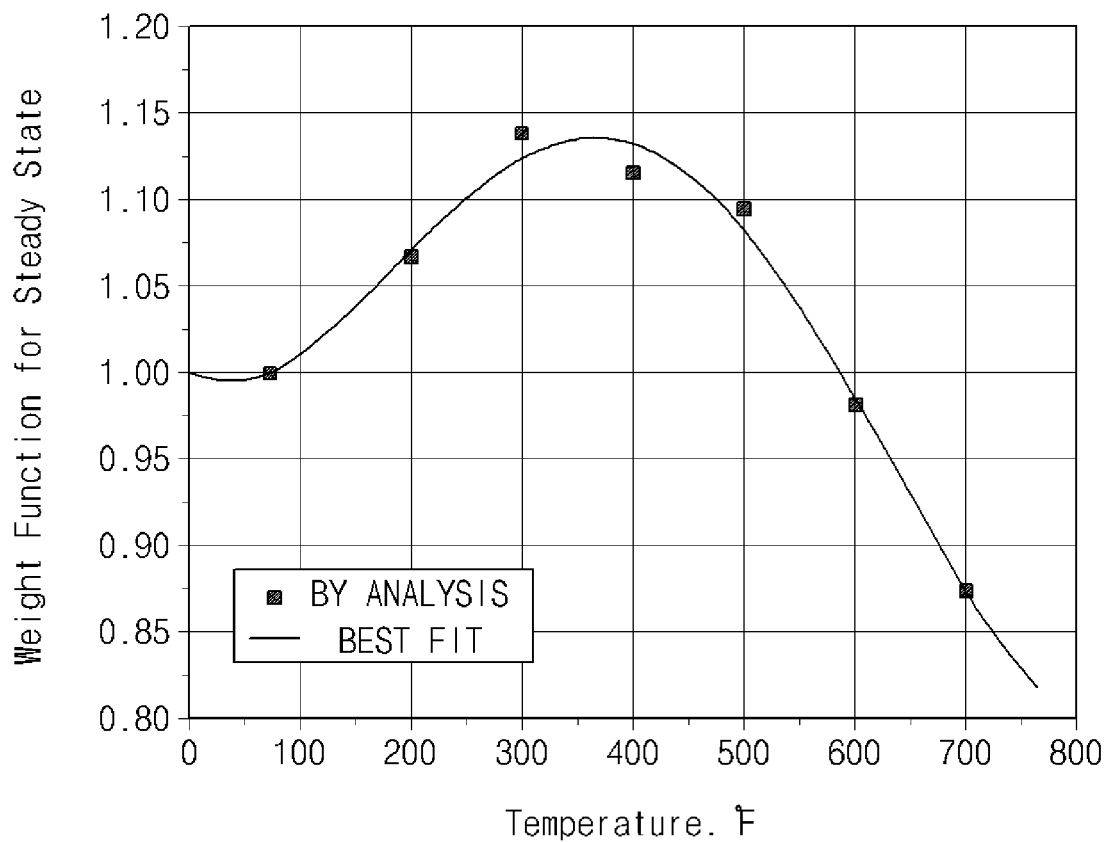
FIG. 4 illustrates a graph of a steady state thermal stress weight function expressed with an optimal curve in accordance with an embodiment of the present invention.

FIG. 4 illustrates a graph of a steady state thermal stress weight function expressed with an optimal curve according to an embodiment of the present invention.

Additionally, a steady state thermal stress weight function is expressed with the following <Equation 3>, so as to obtain an optimal curve of a polynomial steady state thermal stress weight function.

$$W_{Ts} = A_0 + A_1 T + A_2 T^2 + A_3 T^3 + A_4 T^4 \qquad \text{<Equation 3>}$$

T=metal temperature
$A_0$=1.00133
$A_1$=−4.1513E-4
$A_2$=6.6254E-4
$A_3$=−1.5775E-8
$A_4$=9.6885E-12

Additionally, the transient state thermal stress weight function 322 represents a ratio of a temperature dependent thermal stress value to a temperature independent thermal stress value in a transient state as a temperature rate function. Therefore, when a transient state thermal stress weight function is multiplied by an existing Green's function, a temperature dependent Green's function is obtained. Similar to the steady state thermal stress weight function, a transient state thermal stress weight function is changed according to the form, material, boundary temperature, and confined conditions of the object for which a thermal stress value is calculated. Since the transient state thermal stress value is changed according to the hourly temperature change rate, thermal stress weight function values may be obtained for varying rates of hourly temperature change. Through this procedure, a transient state thermal stress weight function can be determined at required intervals.

Figure 5:
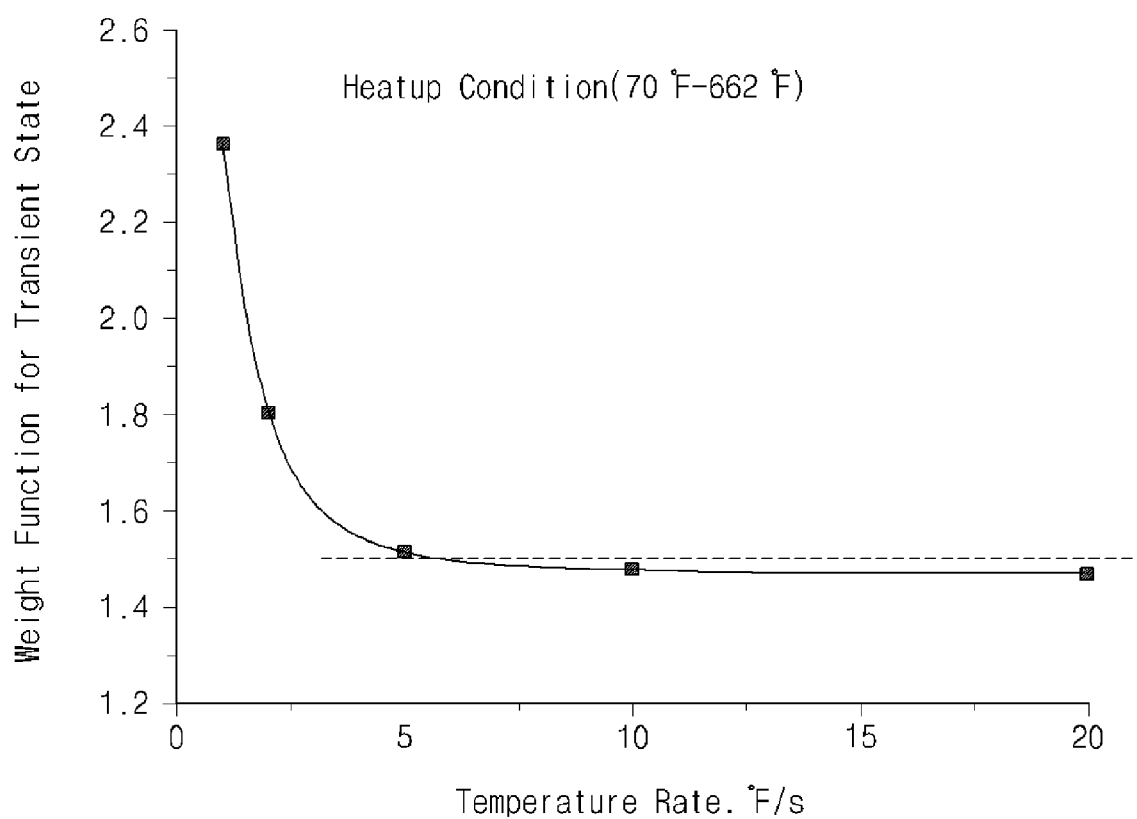
FIG. 5 illustrates a graph of a thermal stress weight function curve with respect to a temperature rate (Fahrenheit/second) in accordance with an embodiment of the present invention.

FIG. 5 illustrates a graph of a thermal stress weight function curve with respect to a temperature rate (Fahrenheit/second) according to an embodiment of the present invention.

Additionally, the temperature dependent thermal stress 330 represents thermal stress in a material with consideration of a change in physical properties of the temperature dependent material, and is the ultimate result that embodiments of the present invention attempt to achieve.

As described above, according to aspects of embodiments, by designing a weight function such that changes in physical properties of a material depending on temperature change are considered, accuracy in the calculation of a thermal stress value can be improved.

Accordingly, changes in thermal and mechanical properties of materials depending on temperature change can be considered in the calculation of thermal stress values of materials. Therefore, a more accurate thermal stress value can be obtained compared to a typical temperature dependent Green's function that cannot consider the above change.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A temperature dependent Green's function calculation device using a weight function comprising:
    a steady state thermal stress calculation unit receiving change information of a material temperature and calculating a steady state thermal stress with respect to a temperature dependent Green's function using a steady state thermal stress weight function;
    a transient state thermal stress calculation unit receiving change information of a material temperature and calculating a transient state thermal stress with respect to a temperature dependent Green's function using a transient state thermal stress weight function; and
    a temperature dependent thermal stress calculation unit receiving the steady state thermal stress calculated by the steady state thermal stress calculation unit and the transient state thermal stress calculated by the transient state thermal stress calculation unit, and calculating and outputting a temperature dependent thermal stress.

2. The temperature dependent Green's function calculation device as claimed in claim 1, wherein the steady state thermal stress calculation unit calculates the steady state thermal stress weight function as a ratio of a temperature dependent thermal stress value to a temperature independent thermal stress value in a steady state.

3. The temperature dependent Green's function calculation device as claimed in claim 2, wherein the temperature dependent thermal stress calculation unit outputs a temperature dependent thermal stress using the following equation:

$$\sigma_T(p, t) = G_s(p) W_{Ts}(\phi)[\phi(t) - T_{ref}] + \sum_{t-t_d}^{t} \overline{G}(p, t-\tau) W_T(\phi) \Delta\phi(\tau)$$

where $\sigma_T(p,t)$ is a temperature dependent thermal stress and $G_s(p) W_{Ts}(\phi)[\phi(t) - T_{ref}]$ is a steady state thermal stress and $$\sum_{t-t_d}^{t} \overline{G}(p, t-\tau) W_T(\phi) \Delta\phi(\tau)$$

is a transient state thermal stress.

4. The temperature dependent Green's function calculation device as claimed in claim 1, wherein the steady state thermal stress calculation unit sets and calculates the steady state thermal stress weight function as a polynomial function depending on temperature.

5. The temperature dependent Green's function calculation device as claimed in claim 4, wherein the temperature dependent thermal stress calculation unit outputs a temperature dependent thermal stress using the following equation:

$$\sigma_T(p, t) = G_s(p) W_{Ts}(\phi)[\phi(t) - T_{ref}] + \sum_{t-t_d}^{t} \overline{G}(p, t-\tau) W_T(\phi) \Delta\phi(\tau)$$

where $\sigma_T(p,t)$ is a temperature dependent thermal stress and $G_s(p) W_{Ts}(\phi)[\phi(t) - T_{ref}]$ is a steady state thermal stress and $$\sum_{t-t_d}^{t} \overline{G}(p, t-\tau) W_T(\phi) \Delta\phi(\tau)$$

is a transient state thermal stress.

6. The temperature dependent Green's function calculation device as claimed in claim 1, wherein the transient state thermal stress calculation unit calculates the transient state thermal stress weight function as a ratio of a temperature dependent thermal stress value to a temperature independent thermal stress value in a transient state.

7. The temperature dependent Green's function calculation device as claimed in claim 6, wherein the temperature dependent thermal stress calculation unit outputs a temperature dependent thermal stress using the following equation:

$$\sigma_\Gamma(p, t) = G_s(p) W_{Ts}(\phi)[\phi(t) - T_{ref}] + \sum_{t-t_d}^{t} \overline{G}(p, t-\tau) W_T(\phi) \Delta\phi(\tau)$$

where $\sigma_\Gamma(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau) W_T(\phi) \Delta\phi(\tau)$$

is a transient state thermal stress.

8. The temperature dependent Green's function calculation device as claimed in claim 1, wherein the transient state thermal stress calculation unit sets and calculates the transient state thermal stress weight function as a weight function value with respect to an hourly rate of temperature change.

9. The temperature dependent Green's function calculation device as claimed in claim 1, wherein the temperature dependent thermal stress calculation unit outputs a temperature dependent thermal stress using the following equation:

$$\sigma_\Gamma(p, t) = G_s(p) W_{Ts}(\phi)[\phi(t) - T_{ref}] + \sum_{t-t_d}^{t} \overline{G}(p, t-\tau) W_T(\phi) \Delta\phi(\tau)$$

where $\sigma_\Gamma(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau) W_T(\phi) \Delta\theta(\tau)$$

is a transient state thermal stress.

10. A method for calculating a temperature dependent Green's function using a weight function, the method comprising:
   calculating, by a steady state thermal stress calculation unit, a steady state thermal stress with respect to a temperature dependent Green's function using a steady state thermal stress weight function after receiving change information of a material temperature;
   calculating, a transient state thermal stress calculation unit, a transient state thermal stress with respect to a temperature dependent Green's function using a transient state thermal stress weight function after receiving change information of a material temperature; and
   calculating and outputting, by a temperature dependent thermal stress calculation unit, a temperature dependent thermal stress after receiving the steady state thermal stress and the transient state thermal stress.

11. The method claimed as in claim 10, wherein the calculating of the steady state thermal stress comprises calculating the steady state thermal stress weight function as a ratio of a temperature dependent thermal stress value to a temperature independent thermal stress value in a steady state.

12. The method claimed as in claim 11, wherein the calculating and outputting of the temperature dependent thermal stress comprises outputting a temperature dependent thermal stress using the following equation:

$$\sigma_\Gamma(p, t) = G_s(p) W_{Ts}(\phi)[\phi(t) - T_{ref}] + \sum_{t-t_d}^{t} \overline{G}(p, t-\tau) W_T(\phi) \Delta\phi(\tau)$$

where $\sigma_\Gamma(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau) W_T(\phi) \Delta\phi(\tau)$$

is a transient state thermal stress.

13. The method claimed as in claim 10, wherein the calculating of the steady state thermal stress comprises setting and calculating the steady state thermal stress weight function as a polynomial function dependent on temperature.

14. The method claimed as in claim 13, wherein the calculating and outputting of the temperature dependent thermal stress comprises outputting a temperature dependent thermal stress using the following equation:

$$\sigma_\Gamma(p, t) = G_s(p) W_{Ts}(\phi)[\phi(t) - T_{ref}] + \sum_{t-t_d}^{t} \overline{G}(p, t-\tau) W_T(\phi) \Delta\phi(\tau)$$

where $\sigma_\Gamma(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p, t-\tau) W_T(\phi) \Delta\phi(\tau)$$

is a transient state thermal stress.

15. The method claimed as in claim 10, wherein the calculating of the transient state thermal stress comprises calculating the transient state thermal stress weight function as a ratio of a temperature dependent thermal stress value to a temperature independent thermal stress value in a transient state.

16. The method claimed as in claim 15, wherein the calculating and outputting of the temperature dependent thermal stress comprises outputting a temperature dependent thermal stress using the following equation.

17. The method claimed as in claim 10, wherein the calculating of the transient state thermal stress comprises setting and calculating the transient state thermal stress weight function as a weight function value with respect to an hourly rate of temperature change.

18. The method claimed as in claim 10, wherein the calculating and outputting of the temperature dependent thermal stress comprises outputting a temperature dependent thermal stress using the following equation:

$$\sigma_\Gamma(p,t) = G_s(p)W_{Ts}(\phi)[\phi(t)-T_{ref}] + \sum_{t-t_d}^{t} \overline{G}(p,t-\tau)W_T(\phi)\Delta\phi(\tau)$$

where $\sigma_\Gamma(p,t)$ is a temperature dependent thermal stress and $G_s(p)W_{Ts}(\phi)[\phi(t)-T_{ref}]$ is a steady state thermal stress and $$\sum_{t-t_d}^{t} \overline{G}(p,t-\tau)W_T(\phi)\Delta\phi(\tau)$$

is a transient state thermal stress.

* * * * *